(12) United States Patent
Menendez

(10) Patent No.: US 10,831,794 B2
(45) Date of Patent: *Nov. 10, 2020

(54) DYNAMIC ALTERNATE KEYS FOR USE IN FILE SYSTEMS UTILIZING A KEYED INDEX

(71) Applicant: International Business Machines Corporation, Armonk, NY (US)

(72) Inventor: Terri A. Menendez, Richmond, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,045

(22) Filed: Jul. 17, 2018

(65) Prior Publication Data

US 2018/0322187 A1 Nov. 8, 2018

Related U.S. Application Data

(63) Continuation of application No. 14/459,220, filed on Aug. 13, 2014, now Pat. No. 10,083,225.

(51) Int. Cl.
*G06F 16/31* (2019.01)
*G06F 16/901* (2019.01)

(52) U.S. Cl.
CPC .......... *G06F 16/328* (2019.01); *G06F 16/901* (2019.01)

(58) Field of Classification Search
USPC ........................................................ 707/741
See application file for complete search history.

(56) References Cited

U.S. PATENT DOCUMENTS

| 4,408,273 | A | 10/1983 | Plow |
|---|---|---|---|
| 8,527,481 | B2 | 9/2013 | Thompson |
| 10,083,225 | B2 | 9/2018 | Menendez |

(Continued)

FOREIGN PATENT DOCUMENTS

EP 0040694 A2 12/1981

OTHER PUBLICATIONS

D.K. Thompson, VSAM Key Sequential Data Sets Stripes Data, IP.com, Dec. 1, 1997, pp., vol. 40 No. 12, pp. 115, 116 (Year: 1997).*

(Continued)

*Primary Examiner* — Alford W Kindred
*Assistant Examiner* — Allen S Lin
(74) *Attorney, Agent, or Firm* — Zilka-Kotab, P.C.

(57) ABSTRACT

In one embodiment, a method for providing alternate keys in a keyed index includes creating a first base record in a keyed index of a database, the first base record including a first unique key and a first data record, wherein the first data record includes at least one sub key and at least one first value, each sub key being correlated with a different one of the at least one first value in a sub key/value pair, and creating one or more alternate key records in the database, each of the alternate key records including one of the at least one sub key which is correlated with the first base record and the first unique key of the first base record. The database adheres to virtual storage access method (VSAM) in some approaches. In other approaches, a number of alternate key records created is equal to a number of first sub keys in the first data record.

15 Claims, 7 Drawing Sheets

(56) References Cited

U.S. PATENT DOCUMENTS

| | | | |
|---|---|---|---|
| 2004/0025089 A1 | 2/2004 | Haswarey et al. | |
| 2004/0225865 A1* | 11/2004 | Cox | G06F 17/30477 712/34 |
| 2005/0182776 A1 | 8/2005 | Yennie | |
| 2010/0205193 A1* | 8/2010 | Krishna | G06F 17/30528 707/758 |
| 2013/0326001 A1 | 12/2013 | Jorgensen et al. | |
| 2013/0339366 A1* | 12/2013 | Khimich | G06F 17/30587 707/741 |
| 2014/0324861 A1* | 10/2014 | Ray | G06F 17/30442 707/737 |
| 2016/0048582 A1 | 2/2016 | Menendez | |

OTHER PUBLICATIONS

Menendez, T., U.S. Appl. No. 14/459,220, filed Aug. 13, 2014.
Ashton et al., "Dynamic Key-Boundary Multi-Cluster Virtual Sequential Access Method Data Sets," IP.com, vol. 41, No. 1, Jan. 1, 1998, pp. 563-564.
Henley, M., "Highlights From The 1988 Survey of MVS DASD Usage," CMG Transactions, 147-151 Summer 1989, pp. 147-151.
Anonymous, "Improved VSAM Performance and Reliability Through Replaceable Dummy High Key," IP.com, Jun. 2, 2010, pp. 1-2.
IBM, "Substitute Key Access Structure," IP.com, Feb. 11, 2010, pp. 1-2.
Thompson D.K., "VSAM Key Sequential Data Sets Striped Data," IP.com, vol. 40, No. 12, Dec. 1, 1997, pp. 115-116.
Non-Final Office Action from U.S. Appl. No. 14/459,220, dated Aug. 22, 2016.
Final Office Action from U.S. Appl. No. 14/459,220, dated Jan. 4, 2017.
Advisory Action from U.S. Appl. No. 14/459,220, dated Mar. 9, 2017.
Non-Final Office Action from U.S. Appl. No. 14/459,220, dated Jun. 27, 2017.
Final Office Action from U.S. Appl. No. 14/459,220, dated Nov. 7, 2017.
Advisory Action from U.S. Appl. No. 14/459,220, dated Feb. 14, 2018.
Notice of Allowance from U.S. Appl. No. 14/459,220, dated May 15, 2018.
List of IBM Patents or Patent Applications Treated as Related.

* cited by examiner

DYNAMIC ALTERNATE KEYS FOR USE IN FILE SYSTEMS UTILIZING A KEYED INDEX

BACKGROUND

The present invention relates to data storage systems, and more specifically, this invention relates to using dynamic alternate keys in file systems which utilize a keyed index.

Virtual storage access method (VSAM) is a disk file storage access method used in IBM z/OS environments. VSAM data sets include multiple records, and the data sets are of fixed or variable length, and are organized into fixed-size blocks called Control Intervals (CIs). The CIs are then organized into larger groups referred to as Control Areas (CAs). CIs are used as units of transfer between direct access storage devices (DASDs) and requesting systems such that a read request will read one complete CI. CAs are used as units of allocation, such that when a VSAM data set is defined, an integral number of CAs will be allocated for that VSAM data set.

An integrated catalog facility (ICF) is provided on a server or mainframe which includes two components, a basic catalog structure (BCS) and a VSAM volume data set (VVDS). The BCS, sometimes referred to as a catalog generically, is typically structured as a VSAM key sequence data set (KSDS) which is an indexed VSAM organization having the most structured form of a data set, and allows for the VSAM to provide a majority of the access routines without substantial input or direction from the accessing system, besides the most rudimentary information. The BCS component is typically accessed via VSAM non-shared resource (NSR) interfaces, and includes information related to a location of user data sets and system data sets (whichever are stored to the corresponding disk, tape, or optical drive).

The VVDS is typically structured as a VSAM entry sequenced data set (ESDS) which is less structured than the VSAM KSDS. ESDSs do not contain an index component and require access routines to track the location of the records stored in the ESDS. Pointers to VVDS records in the ESDS are stored in the associated BCS records. The VSAM ESDS is accessed via both VSAM NSR and media manager interfaces, and includes information about specific attributes of user data sets and system data sets (whichever are stored to the corresponding DASD). The ICF allows for cross-system sharing of the BCS and VVDS, and is entirely responsible for sharing serialization, caching, and buffer invalidation, among other functions.

With key sequenced data sets (KSDSs), the contents consist of the users data and a unique key (specified by the user) which is used to locate specific data records in the data set. Each record in a KSDS has one unique key. Entry sequenced data sets (ESDSs) on the other hand, only contain user data, and the user provides the relative byte address (RBA) of the location of the specific data records for the VSAM to locate. The VSAM data sets containing the user data are referred to as the "base" data sets.

Typically, applications are controlled at the database administration (DBA) level. Databases generally include one or more records (that may be included in a data set) that each include "known" information located at one or more pre-determined locations in the records. The definition/location of the known information, often referred to as "fields" or "schema," is a physical attribute of the database. Creating or changing these attributes involves a collaborative effort between the DBA and application developers, where the format of the data must match the logic of the application program(s). Changes to the program logic may require reformatting all the records in the database and may also effect other application programs accessing the same database, resulting in a difficult and lengthy changeover process in order to implement the changes.

Accordingly, it would be helpful to remove the need for pre-determined fields or schema when using a keyed index, such as VSAM KSDS, and others known in the art. This would allow for application programmers to dynamically create relationships between records in the data set for the specific application program being developed.

BRIEF SUMMARY

In one embodiment, a computer program product for providing alternate keys in a keyed index includes a computer readable storage medium having program code embodied therewith, the program code being readable and/or executable by at least one processor to cause the at least one processor to create, by the at least one processor, a first base record in a database, the first base record including a first unique key and a first data record, wherein the first data record includes at least one sub key and at least one first value, each sub key being correlated with a different one of the at least one first value in a sub key/value pair, and create, by the at least one processor, one or more alternate key records in the database, each of the alternate key records including one of the at least one sub key which is correlated with the first base record and the first unique key of the first base record. A number of alternate key records created is equal to a number of first sub keys in the first data record.

In another embodiment, a computer program product for providing alternate keys in a keyed index includes a computer readable storage medium having program code embodied therewith, the program code being readable and/or executable by at least one processor to cause the at least one processor to create, by the at least one processor, a first base record in a database, the first base record including a first unique key and a first data record, wherein the first data record includes at least one sub key and at least one first value, each sub key being correlated with a different one of the at least one first value in a sub key/value pair, and create, by the at least one processor, one or more alternate key records in the database, each of the alternate key records including one of the at least one sub key which is correlated with the first base record and the first unique key of the first base record. The database adheres to virtual storage access method (VSAM).

In another embodiment, a method for providing alternate keys in a keyed index includes creating a first base record in a keyed index of a database, the first base record including a first unique key and a first data record, wherein the first data record includes at least one sub key and at least one first value, each sub key being correlated with a different one of the at least one first value in a sub key/value pair, and creating one or more alternate key records in the database, each of the alternate key records including one of the at least one sub key which is correlated with the first base record and the first unique key of the first base record. The database adheres to virtual storage access method (VSAM). A plurality of base records are created in the keyed index, and the keyed index is a key sequence data set (KSDS).

Other aspects and embodiments of the present invention will become apparent from the following detailed description, which, when taken in conjunction with the drawings, illustrate by way of example the principles of the invention.

DETAILED DESCRIPTION

Figure 1:
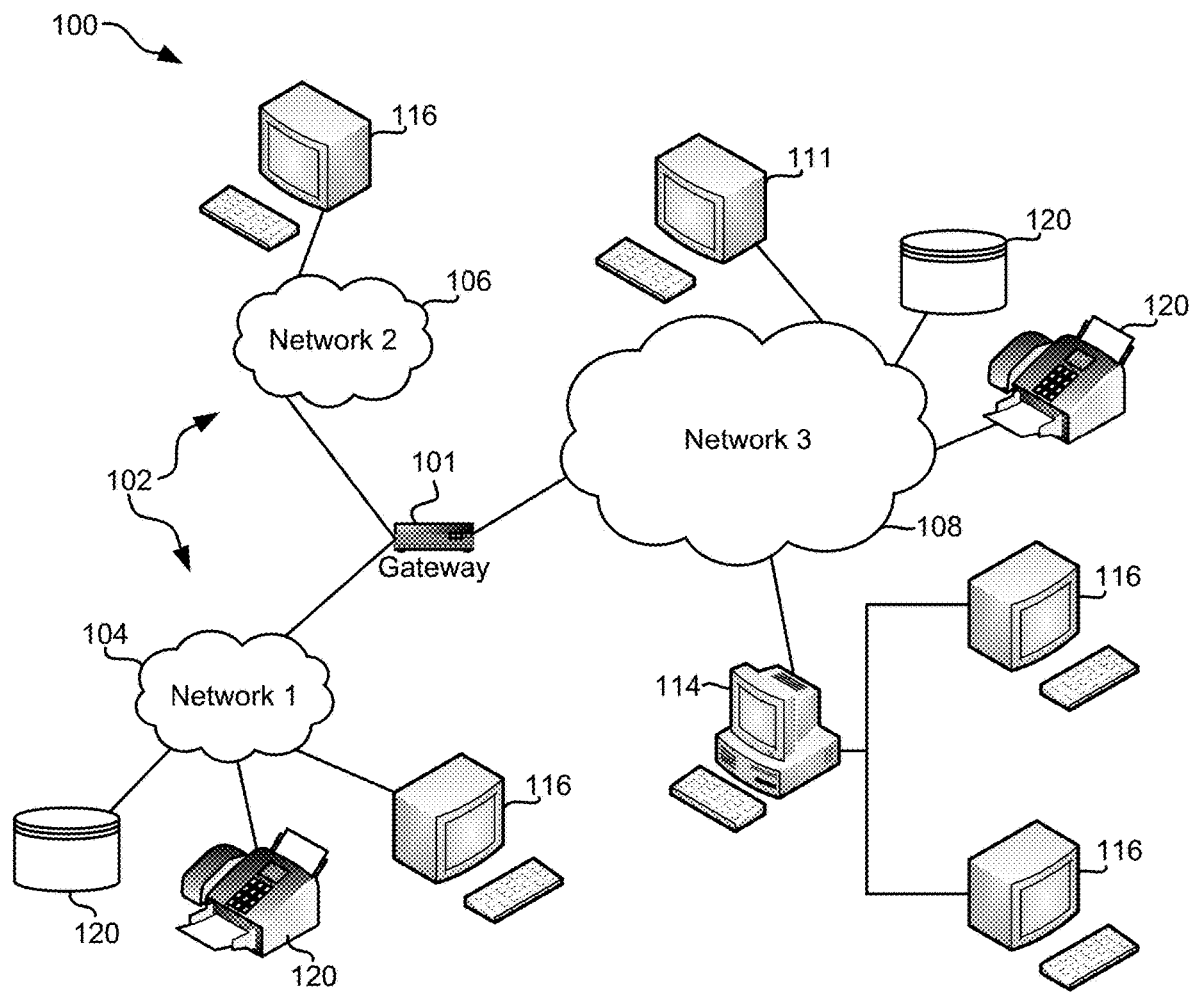
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for creating relationships at an application programming level, which is referred to as "dynamic alternate keys," and allowing for data structures to be controlled at the application programming level as opposed to the database administration (DBA) level, thereby allowing for a highly flexible programming environment.

In one general embodiment, a system includes at least one processor and logic integrated with and/or executable by the at least one processor, the logic being configured to create a first base record in a keyed index of a database, the first base record including a first unique key and a first data record, wherein the first data record includes at least one sub key and at least one first value, each sub key being correlated with a different one of the at least one first value in a sub key/value pair, and create one or more alternate key records in the database, each of the alternate key records including one of the at least one sub key which is correlated with the first base record and the first unique key of the first base record.

In another general embodiment, a computer program product for providing alternate keys in a keyed index includes a computer readable storage medium having program code embodied therewith, the program code being readable and/or executable by at least one processor to cause the at least one processor to create, by the at least one processor, a first base record in a database, the first base record including a first unique key and a first data record, wherein the first data record includes at least one sub key and at least one first value, each sub key being correlated with a different one of the at least one first value in a sub key/value pair, and create, by the at least one processor, one or more alternate key records in the database, each of the alternate key records including one of the at least one sub key which is correlated with the first base record and the first unique key of the first base record.

In another general embodiment, a method for providing alternate keys in a keyed index includes creating a first base record in a keyed index of a database, the first base record including a first unique key and a first data record, wherein the first data record includes at least one sub key and at least one first value, each sub key being correlated with a different one of the at least one first value in a sub key/value pair, and creating one or more alternate key records in the database, each of the alternate key records including one of the at least one sub key which is correlated with the first base record and the first unique key of the first base record.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
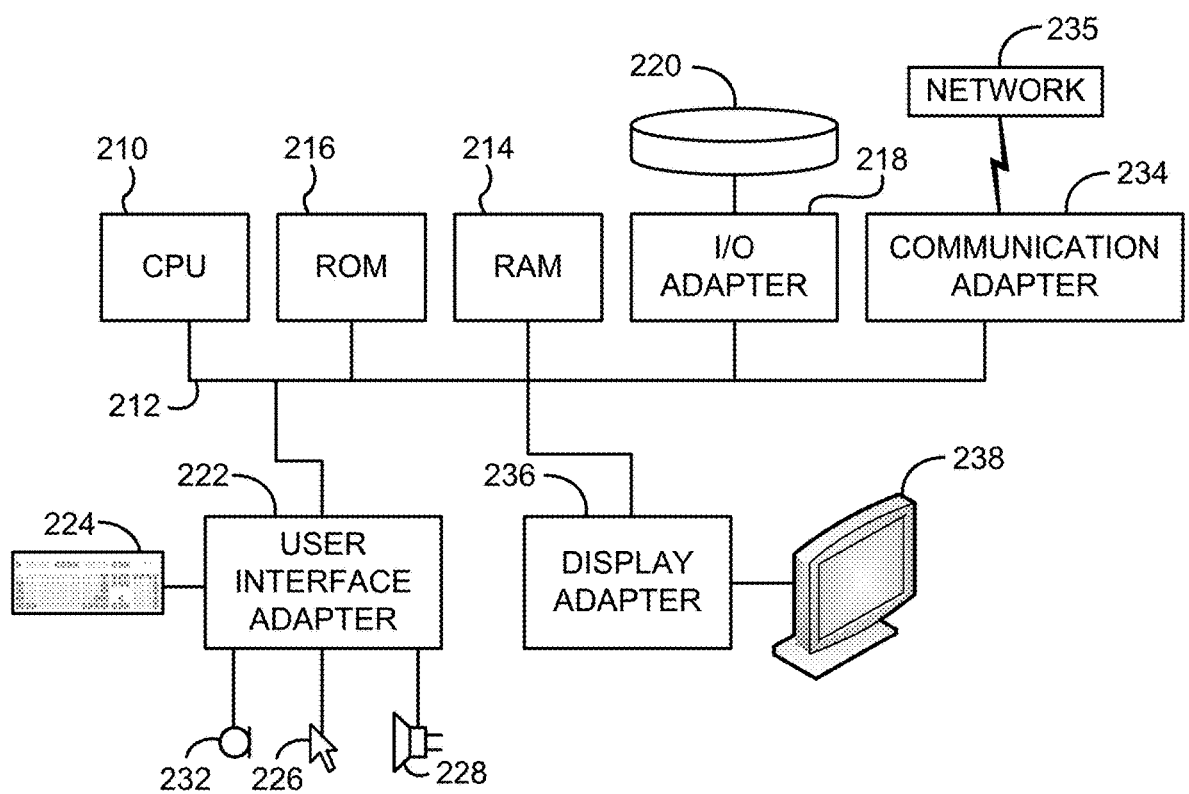
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
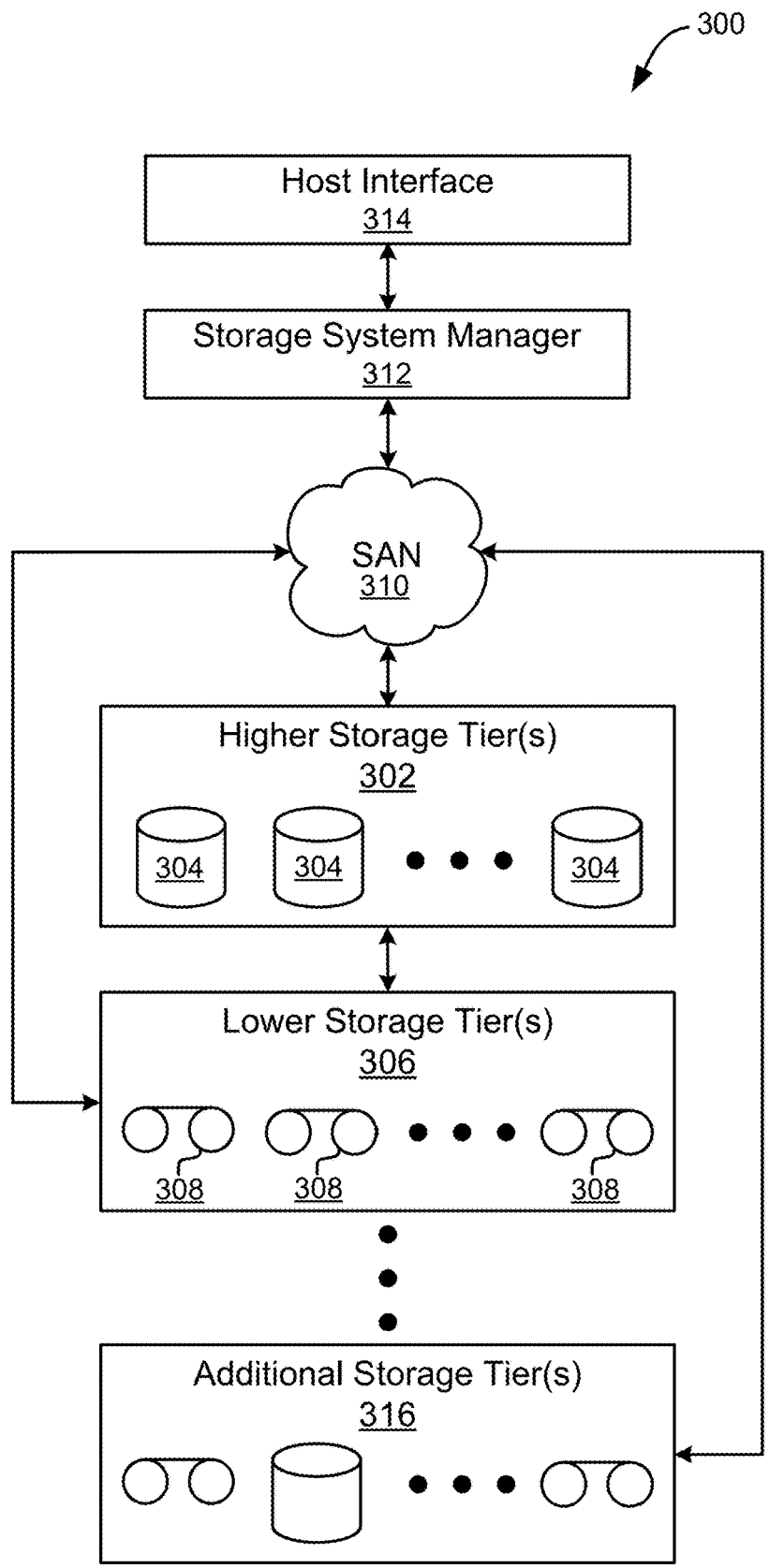
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including slower accessing HDDs, sequential access media such as magnetic tape in tape drives and/or optical media, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media (up to and including all SSD storage media) for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

In one particular embodiment, the storage system 300 may include a combination of SSDs and HDDs, with the higher storage tier 302 including SSDs (and possibly some buffer memory) and the lower storage tier 306 including HDDs (and possibly some buffer memory). According to another embodiment, the storage system 300 may include a combination of SSDs and magnetic tape, with the higher storage tier 302 including SSDs (and possibly some buffer memory) and the lower storage tier 306 including magnetic tape (and possibly some buffer memory). In yet another embodiment, the storage system 300 may include a combination of HDDs and magnetic tape, with the higher storage tier 302 including HDDs (and possibly some buffer memory) and the lower storage tier 306 including magnetic tape (and possibly some buffer memory).

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

In order to allow for dynamic alternate keys, the data created or referenced by the application may be stored as a "base" record in a keyed index, such as a Virtual Storage Access Method (VSAM) Keyed Sequence Data Set (KSDS) or some other keyed index structure known in the art, according to one embodiment. The keyed index structure may be implemented in any desired operating system, such as in IBM z/OS environments, among others known in the art. The base records may be identified via a unique key and include one data record (also referred to as the value). The value of the base record includes one or more "sub" key/value pairs according to this embodiment. In addition to the base records, alternate key records may be created, when desired, to match the sub keys and point back to the associated base record(s). The application program is allowed to create and/or delete sub keys as desired, and may also independently create new relationships between different records in the database. The sub key/value pairs may be created in any order which is advantageous to other known solutions, thereby allowing for a cohesive file system.

To implement dynamic alternate keys, the format of the base record may be modified in order to account for the existence of one or more alternate keys. In this example below, the base record includes a unique key (chosen as "UniqueKey00000000"), and lists a set of lengths and keys in the format of length, value, key, each having a maximum value length, such as 8K, 16K, 32K, 64K, 128K, etc. The base record may also include other keys, such as UniqueKey00000001, which also include the length, value, key. The base record may include a plurality of unique base keys. In one example, the base record may appear as follows:
UniqueKey00000000
  LengthValue1Key1Value1LengthValue2Key2
  Value2 . . . UniqueKey00000001 LengthValueNKeyN-
  ValueN . . .

The base record, with the first unique key "UniqueKey00000000," begins to list sub key/value pairs, such as "LengthValue1Key1Value1." After the list of sub key/value pairs is complete, a blocking record is inserted to continue the base record. There may be a plurality of blocking records also.

After the base record, one or more alternate keys may be included. Each alternate key points back to the base key(s) to which the sub key has an associated value included therein, as shown in the examples below:

| | |
|---|---|
| Key1 | UniqueKey00000000 . . . |
| Key2 | UniqueKey00000000 . . . |
| . . . | |
| KeyN | UniqueKey00000000 . . . |

The alternate keys may be used to reference back to the base record without using the unique key associated with the base record. In one example, using values chosen to represent data, a base record and sub key(s) may be initialized as follows:
  insert({Name:Terri,Hobby:Horses,Job:Programmer})

In this example, three sub keys are included in the base record: Name, Hobby, and Job, and each sub key has an associated value for this base record: Terri, Horses, and Programmer, respectively, which are represented in sub key/value pairs. In addition to the information included in this base record, the unique key for the base record may also be specified, or in another embodiment, it may be selected and/or determined automatically to be unique from all other base record keys.

In one embodiment, each unique key and/or each sub key may be of a fixed length. According to an alternate embodiment, each unique key and/or each sub key may have a variable length determined by its value.

Furthermore, between each field in the record, a predetermined bit pattern (such as "000" or some other easily reproduced pattern) may be placed to identify field breaks.

Based on this example, in the database, when fixed lengths are used for each value (here 8 bytes, but any size may be used, such as 4 bytes, 6 bytes, 12 bytes, etc.), the base record may appear as follows:

| | | | | |
|---|---|---|---|---|
| 0000000010000000 5Name | Terri6Hobby | Horses10Job | Programmer |

Therefore, in the database, the unique key is 0000000010000000 (which may be specified or chosen automatically), and the sub key/value pairs are Name:Terri, Hobby:Horses, and Job:Programmer. Also, each sub key may have a record in the database as follows:

| | |
|---|---|
| Name | 0000000010000000 |
| Hobby | 0000000010000000 |
| Job | 0000000010000000 |

In this way, in the database, each sub key points back to the base key. Now, according to another exemplary embodiment, and using other values chosen to represent data, a base record and alternate key(s) may be initialized, where the Name is Gregg and the Job is Admin, as follows:
  Insert({Name:Gregg,Job:Admin})

Based on this example, in the database, the base record may appear as follows:

| | | |
|---|---|---|
| 0000000020000000 5Name | Gregg5Job | Admin |

Therefore, in the database, the unique key is 0000000020000000, and the sub key/value pairs are Name: Gregg and Job:Admin. Also, each sub key may have a record in the database, updated as shown below:

| | |
|---|---|
| Name | 0000000010000000 0000000020000000 |
| Hobby | 0000000010000000 |
| Job | 0000000010000000 0000000020000000 |

In this way, in the database, sub keys Name and Job point to the first base key (base key 1) and the second base key (base key 2), while sub key Hobby only points to the first base key.

In the above examples, two base records were added. The base records may or may not share the same sub keys. Sub keys may be added or deleted as used by individual application programs, and any shared sub keys may be accounted for with the inclusion of the pointers back to the base key(s) in the sub key definitions. These sub key definitions may be updated from time to time whenever a change is made to which base key the sub keys point to, in order to maintain the relationship between base key and sub key(s).

Figure 4A:
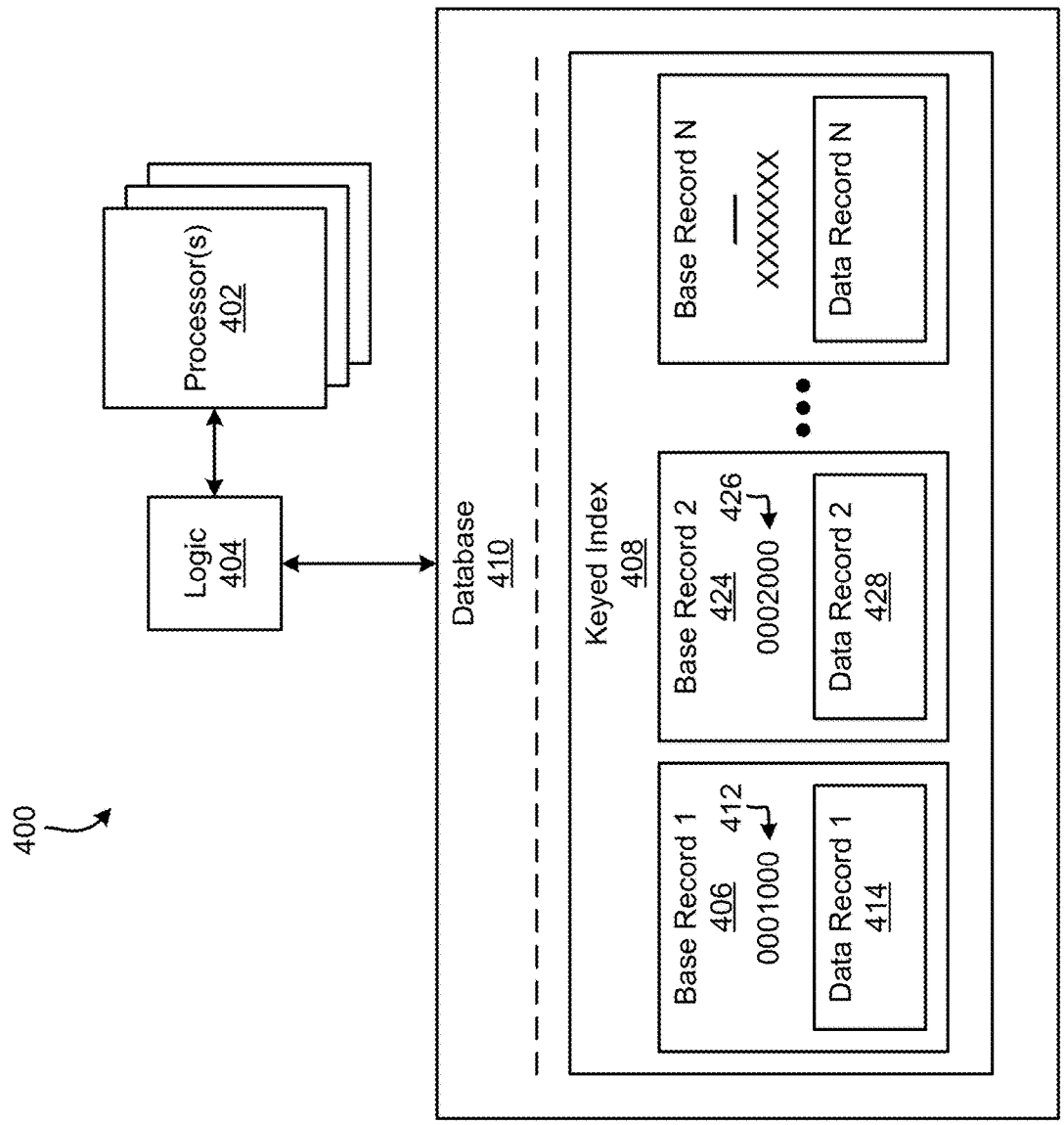
FIG. 4A shows a simplified drawing of a system for providing alternate keys, according to one embodiment.

Referring now to FIG. 4A, a system 400 is shown according to one embodiment. The system 400 includes at least one processor 402 and logic 404 integrated with and/or executable by the at least one processor 402. The logic 404 is configured to create a first base record 406 in a keyed index 408 of a database 410, the first base record 406 including a first unique key 412 and a first data record 414.

In a further embodiment, the logic 404 may be configured to create a second base record 424 in the database 410, the second base record 424 including a second unique key 426 and a second data record 428.

Of course, any number of additional base records may be created as desired by an administrator, application, etc., which is using the keyed index 408 to store information to find other data records and/or data sets stored in the database 410 or elsewhere.

Figure 4B:
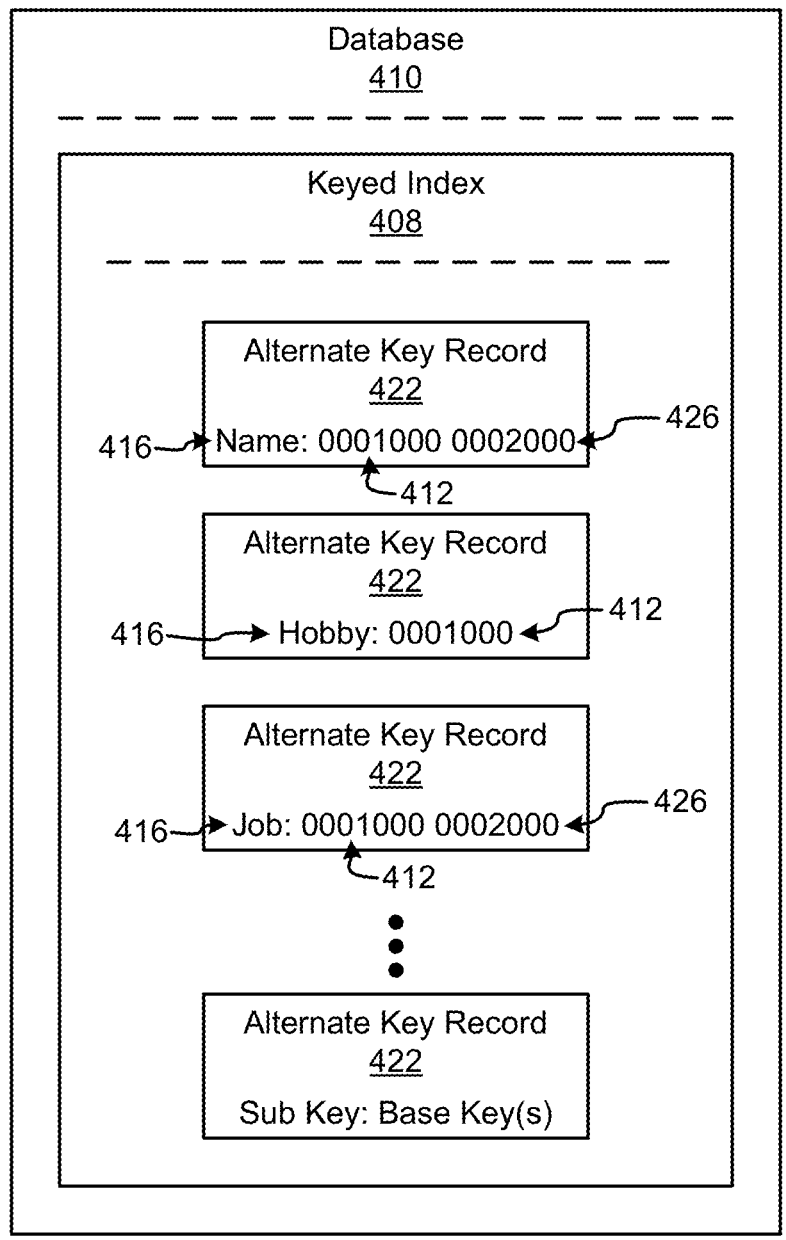
FIG. 4B shows a simplified drawing of alternate key records in a database, according to one embodiment.

As shown in FIG. 4B, the logic may also be configured to create one or more alternate key records 422 in the database 410, such as in the keyed index 408 of the database 410. Each of the alternate key records 422 includes one of the at least one sub keys 416 correlated with any base record unique keys 412, 426, etc., in which the sub key 416 is stored. For example, in the alternate key record 422 for the sub key "Name," the sub key 416 is correlated with the first unique key 412 of the first base record and the second unique key 426 of the second base record.

Any number of alternate key records 422 may be created, one for each unique sub key 416 across the various base records.

As shown in FIG. 4B, in an additional embodiment, the logic may be configured to create one or more additional alternate key records 422 in the database 410 when one or more sub keys 416 are unique to the second base record, each of the additional alternate key records 422 including an unique sub key 416 from the second base record correlated with the second unique key 426 of the second base record 424.

In another embodiment, the logic may be further configured to update an existing alternate key record 422 to store the second unique key 426 and the first unique key 412 when the first base record and the second base record are both correlated with a specific sub key 416 of the existing alternate key record 422.

The logic may also be configured to update the existing alternate key record 422 to remove the second unique key 426 when the specific sub key 416 of the existing alternate key record 422 is removed from the second base record.

In another embodiment, the logic may be further configured to delete an existing alternate key record 422 when the specific sub key 416 of the existing alternate key record 422 is removed from all base records.

Figure 4C:
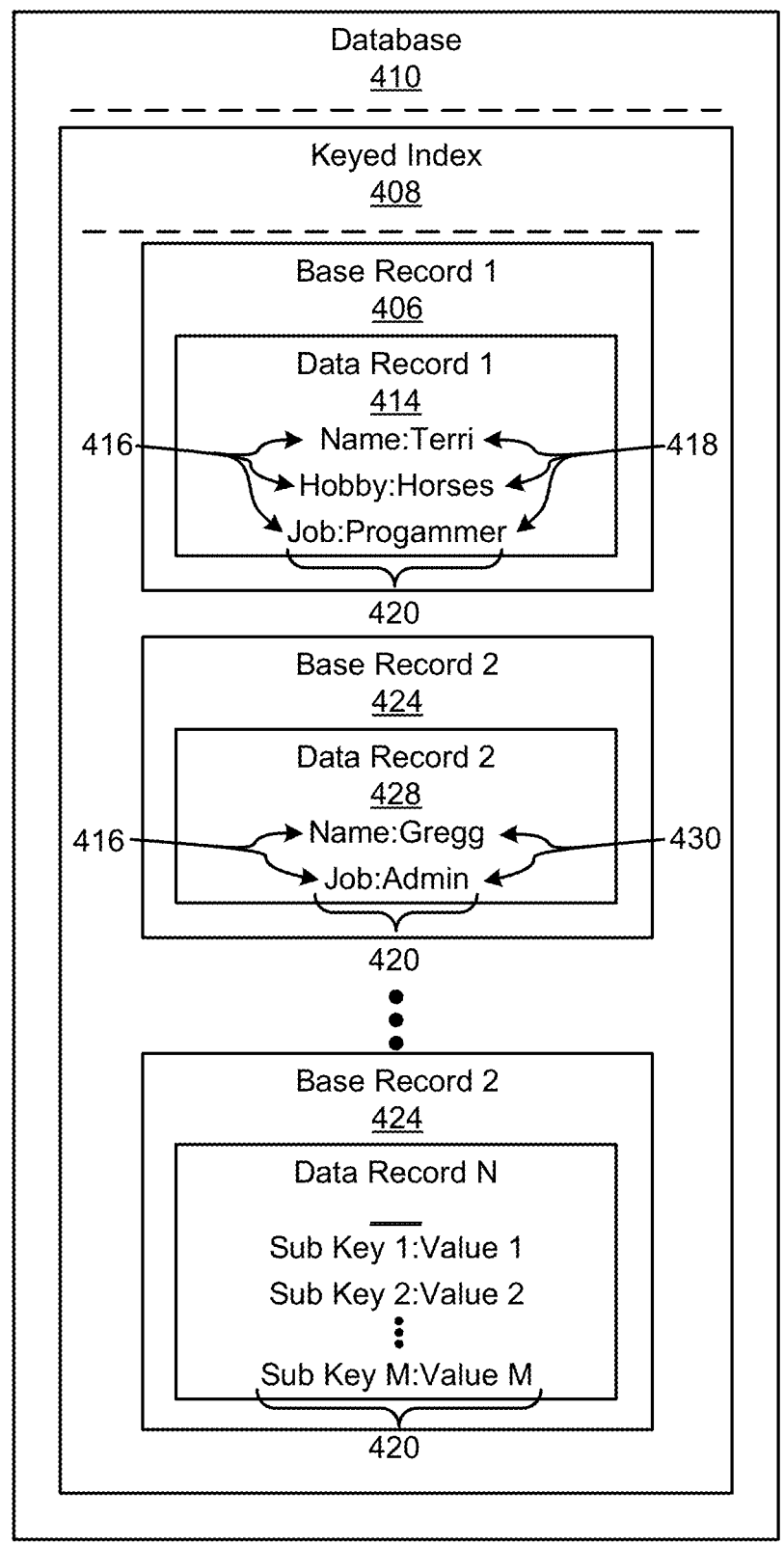
FIG. 4C shows a simplified drawing of base records in a database, according to one embodiment.

With reference to FIG. 4C, the first data record 414 includes at least one sub key 416 and at least one first value 418, each sub key 416 being correlated with a different one of the at least one first value 418 in a sub key/value pair 420.

Also, in an additional embodiment, the second data record 428 may include at least one sub key 416 and at least one second value 430. Each sub key 416 may be correlated with a different one of the at least one second value 430 in a sub key/value pair 420.

In any of these embodiments, the database 410 may adhere to VSAM. Additionally, a plurality of base records may be created in the keyed index 408, the keyed index 408 possibly being a KSDS.

Figure 5:
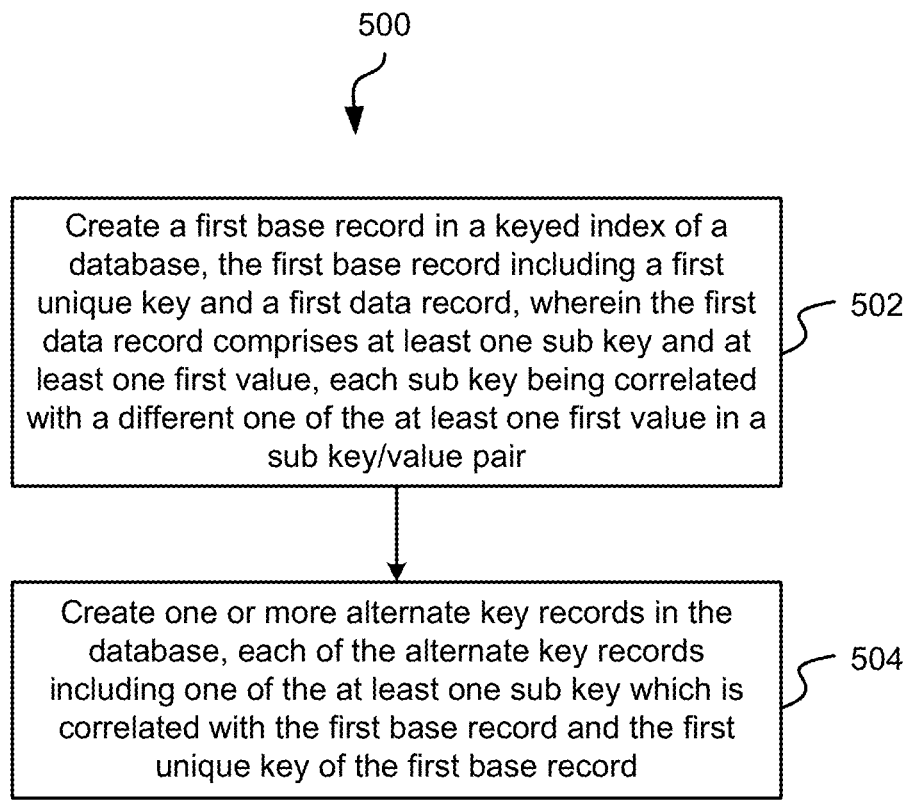
FIG. 5 shows a flowchart of a method according to one embodiment.

Now referring to FIG. 5, a flowchart of a method 500 for providing alternate keys in a keyed index is shown according to one embodiment. The method 500 may be performed in accordance with the present invention in any of the environments depicted in FIGS. 1-4C, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a server, a workstation, or some other device having one or more processors therein. The processor, e.g., processing circuit(s), chip(s), and/or module(s) implemented in hardware and/or software, and preferably having at least one hardware component, may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a first base record is created in a keyed index of a database. The first base record includes a first unique key and a first data record, with the first data record including at least one sub key and at least one first value. Each of the sub keys are correlated with a different one of the at least one first value in a sub key/value pair.

In operation 504, one or more alternate key records are created in the database. Each of the alternate key records includes one of the at least one sub key which is correlated with the first base record and the first unique key of the first base record. In this way, changes may be made to correlate base records with one another using the sub keys, without changing the base records in any way.

In one further embodiment, method 500 may include creating a second base record in the database, the second base record including a second unique key and a second data record. The second data record comprises at least one sub key and at least one second value, each sub key being correlated with a different one of the at least one second value in a sub key/value pair. The method 500 may also include creating one or more additional alternate key records in the database when one or more sub keys are unique to the second base record, each of the additional alternate key records including an unique sub key from the second base record correlated with the second unique key of the second base record.

In another embodiment, method 500 may include updating an existing alternate key record to store the second unique key and the first unique key when the first base record and the second base record are both correlated with a specific sub key of the existing alternate key record.

According to another embodiment, method 500 may include updating the existing alternate key record to remove the second unique key when the specific sub key of the existing alternate key record is removed from the second base record.

In a further embodiment, method 500 may include deleting an existing alternate key record when the specific sub key of the existing alternate key record is removed from all base records.

In yet another embodiment, the database may adhere to VSAM, a plurality of base records may be created in the keyed index, and/or the keyed index may be a KSDS. Of course, other database schemes and/or index types may be used, as would be understood by one of skill in the art upon reading the present descriptions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, operating system, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product for providing alternate keys in a keyed index, the computer program product comprising a computer readable storage medium having program code embodied therewith, the program code being readable and/or executable by at least one processor to cause the at least one processor to:
    create, by the at least one processor, a first base record in a database, the first base record including a first unique key and a first data record, wherein the first data record comprises at least one sub key/value pair, each sub key/value pair including a unique sub key and a value correlated with the sub key;
    create, by the at least one processor, a second base record in the database, the second base record including a second unique key and a second data record, wherein the second data record comprises at least one sub key/value pair, each sub key/value pair including a unique sub key and a second value correlated with the sub key;
    determine, by the at least one processor, that a sub key of the first data record matches a sub key of the second data record;
    in response to determining that the sub keys match, create, by the at least one processor, an alternate key record in the database, the alternate key record including the matching sub key associated with the first unique key of the first base record and the second unique key of the second base record, wherein a number of alternate key records created having the first unique key of the first base record is equal to a number of sub keys in the first data record; and
    delete an existing alternate key record when a specific sub key of the existing alternate key record is removed from all base records,
    wherein the database adheres to virtual storage access method (VSAM).

2. The computer program product as recited in claim 1, wherein unique alternate key records are created in the database for each of the sub keys in the first base record, each alternate key record including the corresponding sub key and the first unique key of the first base record,
    wherein an additional alternate key record is created in the database for each of the sub keys that is unique to the second base record, each of the additional alternate key records including the unique sub key from the second base record correlated with the second unique key of the second base record.

3. The computer program product as recited in claim 1, wherein the program code is further readable and/or executable by the at least one processor to update an existing alternate key record to store the second unique key and the first unique key when the first base record and the second base record are both correlated with a specific sub key of the existing alternate key record.

4. The computer program product as recited in claim 3, wherein the program code is further readable and/or executable by the at least one processor to update the existing alternate key record to remove the second unique key in response to the specific sub key of the existing alternate key record being removed from the second base record.

5. The computer program product as recited in claim 1, wherein a plurality of base records are created in the keyed index, and wherein the keyed index is a key sequence data set (KSDS).

6. A computer program product for providing alternate keys in a keyed index, the computer program product comprising a computer readable storage medium having program code embodied therewith, the program code being readable and/or executable by at least one processor to cause the at least one processor to:
    create, by the at least one processor, a first base record in a database, the first base record including a first unique key and a first data record, wherein the first data record comprises at least one sub key and at least one first value, each sub key being correlated with a different one of the at least one first value in a sub key/value pair; and
    create, by the at least one processor, one or more alternate key records in the database, each of the alternate key records including one of the at least one sub key which is correlated with the first base record and the first unique key of the first base record,
    wherein a number of alternate key records created is equal to a number of first sub keys in the first data record,
    wherein the database adheres to virtual storage access method (VSAM),
    wherein the program code is further readable and/or executable by the at least one processor to:
        create a second base record in the database, the second base record including a second unique key and a second data record, wherein the second data record comprises at least one sub key and at least one second value, each sub key being correlated with a different one of the at least one second value in a sub key/value pair; and
        create one or more additional alternate key records in the database when one or more sub keys are unique to the second base record, each of the additional alternate key records including a unique sub key from the second base record correlated with the second unique key of the second base record.

7. The computer program product as recited in claim 6, wherein the program code is further readable and/or executable by the at least one processor to update an existing alternate key record to store the second unique key and the first unique key when the first base record and the second base record are both correlated with a specific sub key of the existing alternate key record.

8. The computer program product as recited in claim 7, wherein the program code is further readable and/or executable by the at least one processor to update the existing alternate key record to remove the second unique key when the specific sub key of the existing alternate key record is removed from the second base record.

9. The computer program product as recited in claim 6, wherein the program code is further readable and/or executable by the at least one processor to delete an existing alternate key record when a specific sub key of the existing alternate key record is removed from all base records.

10. The computer program product as recited in claim 6, wherein a plurality of base records are created in the keyed index, and wherein the keyed index is a key sequence data set (KSDS).

11. A method for providing alternate keys in a keyed index, the method comprising:
    creating a first base record in a keyed index of a database, the first base record including a first unique key and a first data record, wherein the first data record comprises at least one sub key and at least one first value, each sub key being correlated with a different one of the at least one first value in a sub key/value pair;
    creating one or more alternate key records in the database, each of the alternate key records including one of the at least one sub key which is correlated with the first base record and the first unique key of the first base record;
    deleting an existing alternate key record when a specific sub key of the existing alternate key record is removed from all base records,
    wherein the database adheres to virtual storage access method (VSAM),
    wherein a plurality of base records are created in the keyed index,
    wherein the keyed index is a key sequence data set (KSDS);
    creating a second base record in the database, the second base record including a second unique key and a second data record, wherein the second data record comprises at least one sub key and at least one second value, each sub key being correlated with a different one of the at least one second value in a sub key/value pair; and
    creating one or more additional alternate key records in the database when one or more sub keys are unique to the second base record, each of the additional alternate key records including a unique sub key from the second base record correlated with the second unique key of the second base record.

12. The method as recited in claim 11, further comprising updating an existing alternate key record to store the second unique key and the first unique key when the first base record and the second base record are both correlated with a specific sub key of the existing alternate key record.

13. The method as recited in claim 12, further comprising updating the existing alternate key record to remove the second unique key when the specific sub key of the existing alternate key record is removed from the second base record.

14. The method as recited in claim 11, wherein a number of alternate key records created is equal to a number of sub keys in the first data record.

15. The method as recited in claim 11, wherein each of the plurality of base records includes a unique key specific to each base record of the plurality of base records.

* * * * *